United States Patent [19]

Gieseke

[11] Patent Number: 4,597,415

[45] Date of Patent: Jul. 1, 1986

[54] INTEGRATED LEVER AND LIVE SPRING VALVE

[75] Inventor: Steven S. Gieseke, Richfield, Minn.

[73] Assignee: Donaldson Company, Inc., Minneapolis, Minn.

[21] Appl. No.: 758,106

[22] Filed: Jul. 23, 1985

[51] Int. Cl.$^4$ ............................................ F16K 11/072
[52] U.S. Cl. ..................................... 137/875; 137/872; 251/298
[58] Field of Search .................. 137/872, 873, 875; 251/298

[56] References Cited

U.S. PATENT DOCUMENTS

| | | | |
|---|---|---|---|
| 176,238 | 4/1876 | Myer | 137/873 |
| 351,940 | 11/1886 | Severding | 137/875 |
| 533,265 | 1/1895 | Belding | 137/875 |
| 819,823 | 5/1906 | Trigg | 137/875 |
| 878,850 | 2/1908 | Young | 137/875 X |
| 925,053 | 6/1909 | Sturgis | 137/875 X |

FOREIGN PATENT DOCUMENTS 1182381 2/1970 United Kingdom ............... 137/875

Primary Examiner—A. Michael Chambers
Assistant Examiner—John C. Fox
Attorney, Agent, or Firm—Merchant, Gould, Smith, Edell, Welter & Schmidt

[57] ABSTRACT

A flexible and resilient normally planar flap valve having two portions which together form a generally elongated oval shape. One portion of the flap has a greater radius than the other portion to restrict movement of the flap when installed in a tubular member. When installed the valve forms a generally arcuate shaped flap having a outer surface configured to conform to the cross-sectional shape of the tubular member. The flap has two operative positions; a first position in which the valve allows air to flow unrestricted through the tube; and a second position in which the valve seals off the main air source and directs air between a side opening and the tubular member. The flap is provided with a handle molded directly to one end of the flap, thereby creating a single piece integrated lever and live spring valve.

6 Claims, 8 Drawing Figures

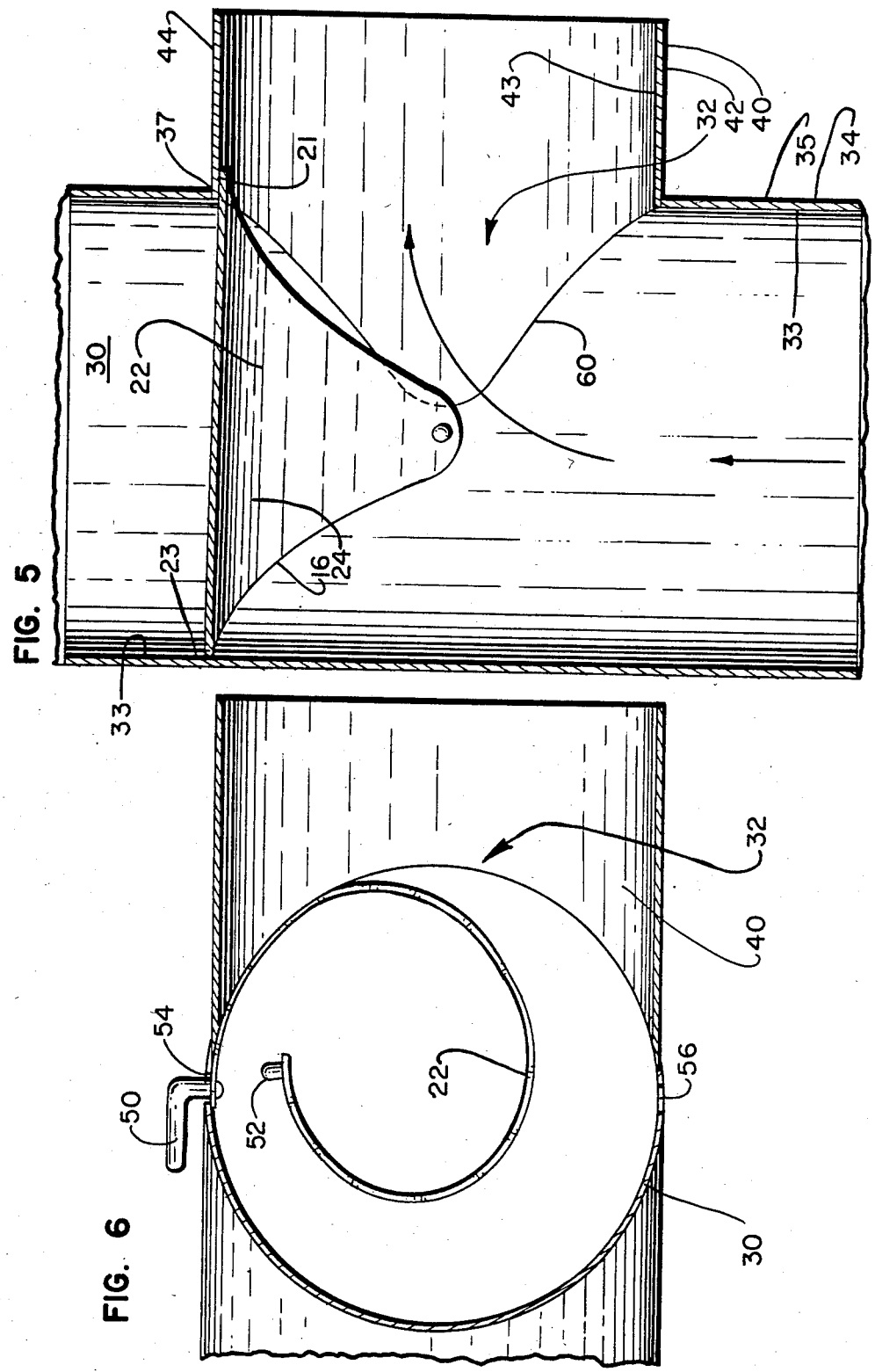

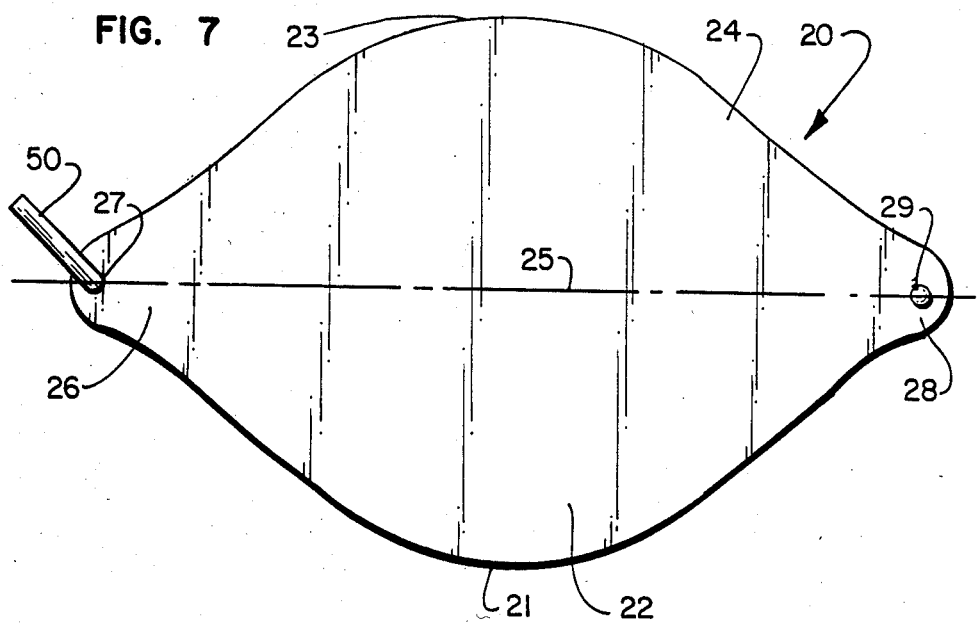
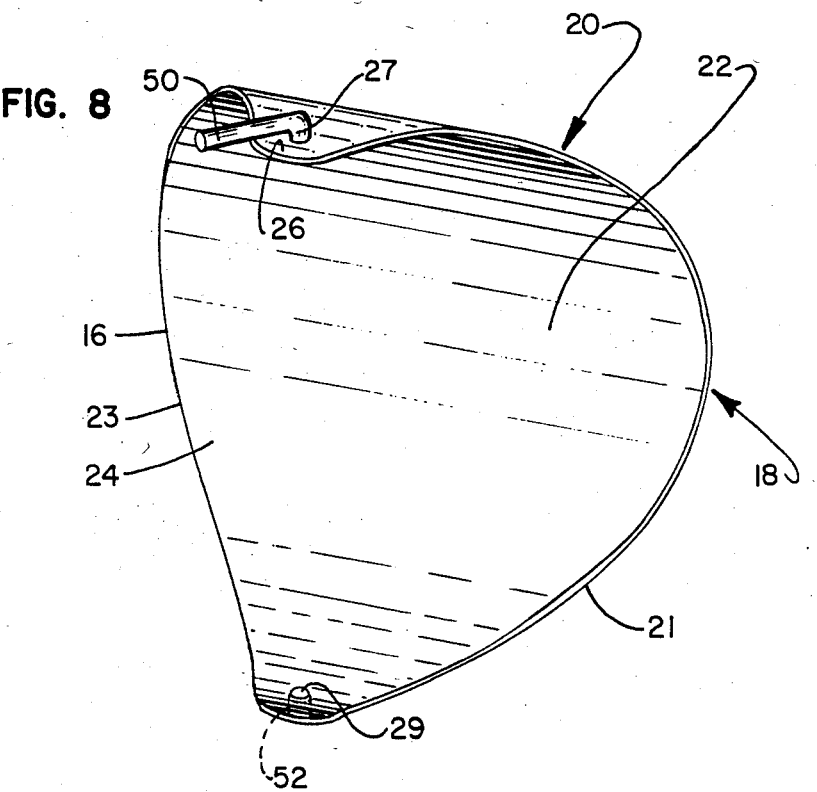

INTEGRATED LEVER AND LIVE SPRING VALVE

TECHNICAL FIELD

The present invention relates generally to the field of valves. More particularly, the preferred valve is embodied as a flexible and resilient normally planar flap which, when mounted in a tubular member, has a generally arcuate shape. The mounted flap, has two operative positions, a first position in which the valve allows air to pass through the tube, and a second position in which the valve seals off the main passage of the tube and directs air between the tube and a side opening therein.

BACKGROUND OF THE INVENTION

In motor vehicles, such as heavy duty trucks, the source of the air supplied to the engine is controlled by one or more shut-off or diverter valves located before the air cleaner. In one position, the shut-off or diverter valves direct the outside air to the air cleaner. Alternatively, the shut-off or diverter valves may be positioned to seal off the outside air and direct warm air from the engine to the air cleaner.

Most trucks currently employ a shut-off or diversion system comprised of two separate valves. One valve is located near the outside air inlet; the second valve is located at the junction of the primary air supply tube and a second tube or opening through which warm air from the engine is made available to the air cleaner. A linkage between the two valves provides for coordinated opening and shutting of the valves. In operation, when one valve is in an open position allowing air to flow therethrough, the other valve will seal off the alternate source of air. The open and shut positions of the valves are reversable to allow air flow from the alternate source only. Usually, one valve is provided with a handle which controls the movement of the valves. A cable connected to the handle allows the operator to control the valve positions in the cab.

The internal linkage between the valves has numerous moving parts, the production of which involves relatively high initial manufacturing costs. Additionally, the tolerances for the flat valves used in existing truck air systems must be carefully controlled. Relatively small errors in tooling can result in valves which do not operate properly when installed. Valves which are too large may stick when actuated, thereby preventing use of the preferred air source. Alternatively, valves which are too small may allow unacceptable leakage of undesired air into the preferred air supply due to excessive clearance between the valve and the tube in which it is mounted.

SUMMARY OF THE INVENTION

The present invention relates to an air flow control valve for use on motor vehicles such as heavy duty trucks. The air flow control valve includes a tubular member having a wall and a side opening in the wall which is substantially similar in shape to the cross-section of the tubular member. A flexible and resilient, normally planar flap having a first portion and a second portion which together form a generally elongated oval shape is pivotally mounted in the tubular member. The flap is mounted in line with the side opening of the tubular member with the pivot points of the flap being coaxially aligned and mounted to opposite points on the wall of the tubular member to form a generally arcuate-shaped flap in the tubular member.

A feature of the invention is that one portion of the flap has a greater radius than the other portion so that when the flap is in a first position it covers the side opening with the side edge of the larger portion abutting against one side of the side opening and the side edge of the smaller portion overlapping the opposite side of the side opening to seal off the side opening and allow air to flow through the tubular member. In a second position, the flap extends across the tubular member with the side edge of the larger portion overlapping the opposite side of the side opening and the side edge of the smaller portion substantially abutting the wall of the tubular member opposite the side opening to seal off the tubular member and direct air flow between the tubular member and the side opening. A handle directly molded at one end of the flap projects through a hole in the wall of the tubular member and provides control over the positioning of the flap when mounted.

The present invention is particularly advantageous in that the flap is a flexible one-piece, integrated handle and valve. The inherent spring tension of the flexible flap provides for better sealing between the valve and the wall of the tubular member when the flap is installed. It will be readily apparent that installation and use of the one-piece integrated lever and live spring valve is simpler than existing two valve systems. Also, the valve of the present invention is less expensive to construct and manufacture.

These and various other advantages and features of novelty which characterize the invention are pointed out with particularity in the claims annexed hereto and forming a part hereof. However, for a better understanding of the invention, its advantages, and objects attained by its use, reference should be had to the drawings which form a further part hereof and to the accompanying descriptive matter, in which there is illustrated and described a preferred embodiment of the invention.

BRIEF DESCRIPTION OF THE DRAWINGS

FIG. 5 is a view of the preferred embodiment of the invention along line 4—4 in FIG. 3 with the flap in its alternate operative position.

FIG. 6 is an enlarged sectional view along line 2—2 in FIG. 1 showing the present invention in a partially installed position.

FIG. 7 is a plan view of the preferred embodiment of the invention in a flat position.

FIG. 8 is a perspective view showing the shape assumed by the preferred embodiment of the invention when installed in a tubular member.

DETAILED DESCRIPTION OF THE PREFERRED EMBODIMENT

Figure 1:
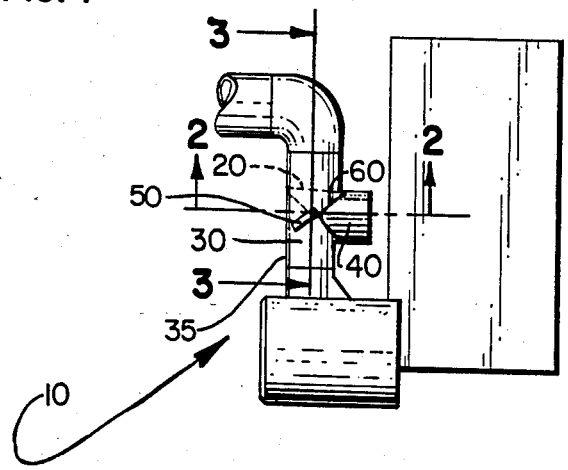
FIG. 1 is a diagrammatic plan view showing a preferred embodiment of the present invention in its operative position.

Referring now to the drawings, there is shown in FIGS. 1 through 8 a preferred embodiment of the present invention generally referred to by the reference numeral 10. As is illustrated, the preferred embodiment of the present invention includes a flap 20 mounted within a receiving tube 30.

In one preferred embodiment, the flap 20 is a normally planar flap of a flexible and resilient material, such as polyethylene. More specifically, the flap 20 has a generally elongated oval shape, as shown best in FIG. 7. The flap 20 is divided into a first portion 22 and a second portion 24 by an imaginary line 25 connecting pivot points 27 and 29 located adjacent first and second ends 26,28 of the flap 20. The imaginary line 25 connecting the pivot points 27,29 defines a common border for the first and second portions 22,24. The first and second portions 22,24 each extend outwardly from the imaginary border 25 to their respective side edge 21,23.

A key feature of the present invention is that the first portion 22 has a radius greater than the second portion 24. Specifically, the radius of the first portion 22 from the imaginary center line 25 to edge 21 is greater than the radius of the second portion 24 from the imaginary center line 25 to the side edge 23.

As shown in FIGS. 1 through 5, the flap 20 is mounted within a tubular member 30. The tubular member 30 includes a wall 34 having an interior surface 33 and an exterior surface 35. A pair of oppositely positioned mounting points 36,38 are located along the wall 34 for securement of the flap 20 within the tubular member 30. In the preferred embodiment of the present invention the wall 34 of the tubular member 30 defines a side opening 32 having a shape substantially similar to the cross-section of the tubular member 30. A second tubular member 40 is joined to the tubular member 30 at the side opening 32. The Tee-type joint 60 formed by connecting the second tubular member 40 to the tubular member 30 at the side opening 32 is representative of the underhood air intake system used in many trucks. However, it will be appreciated that a preferred embodiment of the present invention need not include a second tubular member 40 at side opening 32.

In the preferred embodiment 10, the flap 20 is pivotally mounted in tubular member 30 in line with the side opening 32. Specifically, the pivot points 27,29 of the flap 20 are coaxially aligned and mounted to the opposite mounting points 36,38 on the wall 34 of the tubular member 30. Flap 20 may be secured in position by a number of fastening devices common in the art (screws, rivets, pins, etc.). When mounted in the tubular member 30, the flap 20 takes a generally arcuate shape having an outer surface 18 shaped like the wall 34 at the side opening 32 as best seen in FIG. 8. When in place, the outer edge 16 configures to conform to the cross-sectional shape of the tubular member 30.

Figure 4:
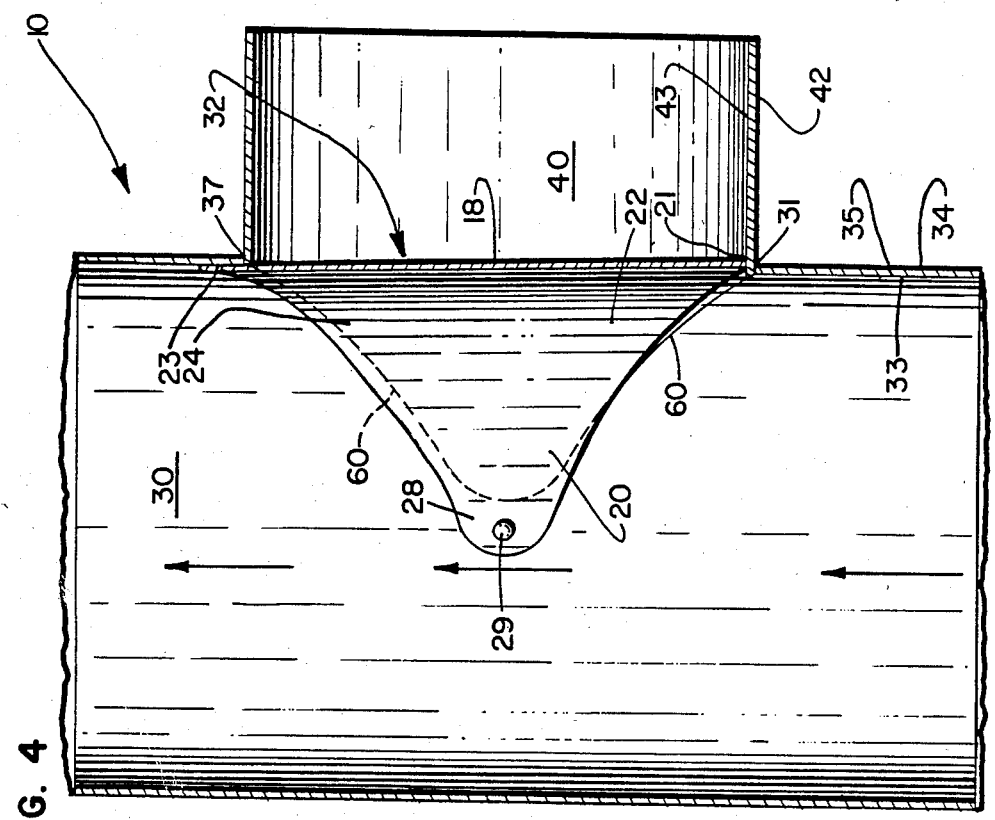
FIG. 4 is a view of the preferred embodiment of the invention along line 4—4 in FIG. 3.

The mounted flap 20 is capable of movement between a first orientation and a second orientation, shown in FIGS. 4 and 5 respectively. In the first orientation, the flap 20 covers the side opening 32 with the side edge 21 of the first portion 22 substantially abutting against the interior surface 43 of one wall 42 of the second tubular member 40 at the junction 60 of the wall 42 and one side 31 of side opening 32. Further, in the first orientation, the side edge 23 of the second portion 24 overlaps the opposite side 37 of the side opening 32 in the first tubular 30. It will be appreciated that when there is no second tubular member 40 located at the side opening 32, the flap 20 covers the side opening 32 in the same manner as described immediately above with the side edge 21 of the first portion 22 substantially abutting directly against one side 31 of the side opening and the side edge 23 of the second portion 24 overlapping the opposite side 37 of the side opening 32. In the first orientation, the flap 20 seals off the side opening 32 and allow air to flow through the tubular member, as indicated by the arrows in FIG. 4.

In the preferred embodiment, the second orientation of the flap 20 in the tubular member 30 arises from a ninety-degree rotation of the flap 20 in the tubular member 30. Rotation of the flap 20 is limited to one direction by the increased radius of the first portion 22. In the second orientation, the flap 20 extends across the tubular member 30 with the side edge 21 of the first portion 22 overlapping the opposite wall 44 of the second tubular member 40 and the side edge 23 of the second portion 24 substantially abutting the interior surface 33 of the wall 34 of the tubular member 30 opposite the side opening 32. It will be appreciated that in the absence of a second tubular member 40 the flap 20 extends across the tubular member 30 in the same manner as described immediately above with the side edge 21 of the first portion 22 overlapping the opposite side 37 of the side opening 32 and the side edge 23 of the second portion 24 substantially abutting the interior surface 33 of the wall 34 of the tubular member 30 opposite the side opening 32. In the second orientation, the flap 20 seals off external air from the tubular member 30 and directs air flow between the first and second tubular members 30,40 as shown in FIG. 5.

Figure 2:
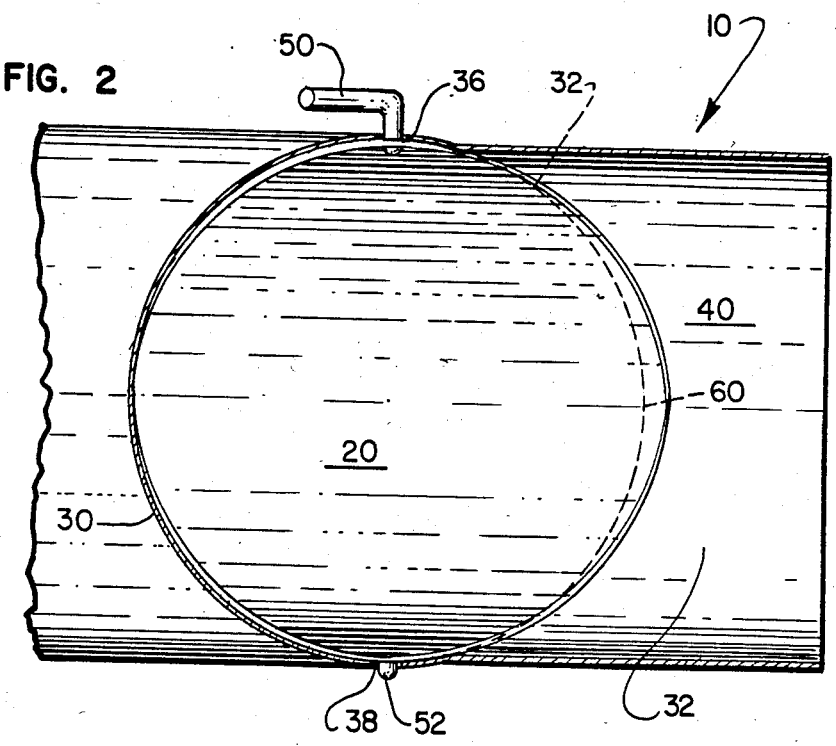
FIG. 2 is an enlarged sectional view along line 2—2 in FIG. 1 showing the present invention in one operative position.
Figure 3:
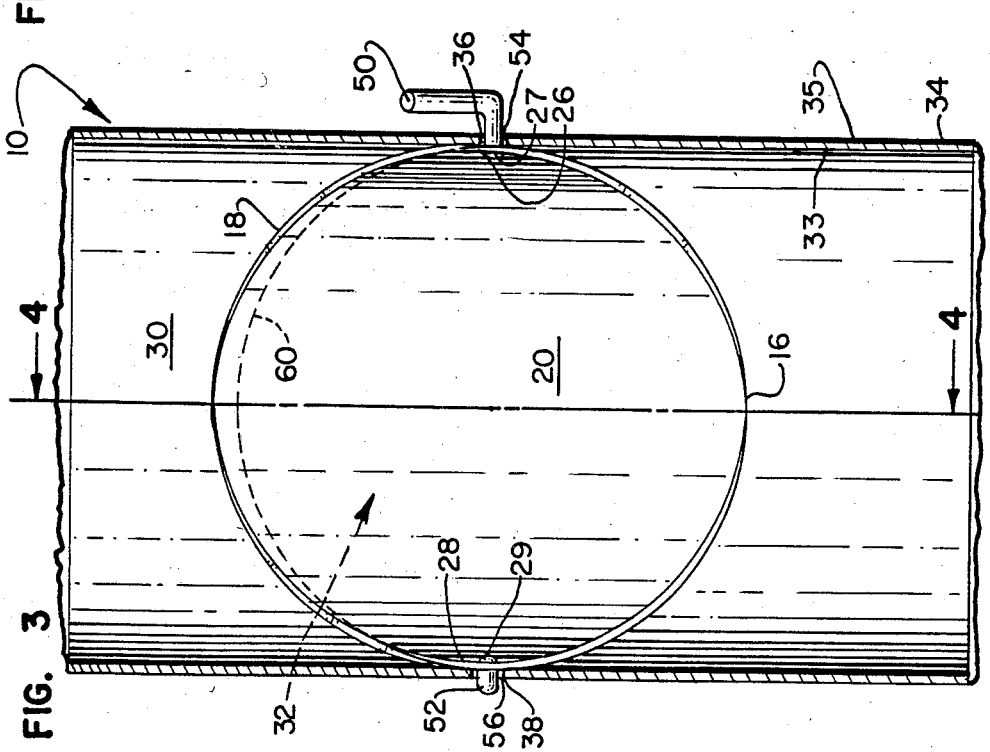
FIG. 3 is an enlarged sectional view along line 3—3 in FIG. 1 with the flap in its alternate operative position.

In the preferred embodiment the flap 20 is moved between its first and second orientation by a handle 50 attached to the flap 20 at one pivot point 27 adjacent an end 26 of the flap. Additionally, in the preferred embodiment, one of the mounting points 36 for the flap 20, defines a hole 54 through the wall 34 of the tubular member 30. The handle 50 projects through the hole 54 and is positioned external to the tubular member 30 to provide control of the flap 20. It will be appreciated that the handle 50 may be molded directly to the outer surface 18 of the flap 20 at either end 26,28. Further, as best seen in FIGS. 2 and 3 a projection 52 may be provided at the pivot point 29 opposite the pivot point 27 at which the handle 50 is located, thereby resulting in a one-piece integrated lever and valve.

Installation of the preferred embodiment of the flap 20 is acheived by first inserting handle 50 through hole 54 as shown in FIG. 6. Installation is then completed by securing projection 52 at the opposite mounting point 38. In the preferred embodiment mounting point 38 defines a hole 56 through the wall 34 of tubular member 30 to facilitate securement of the flap 20. As seen in FIGS. 2 and 3, projection 52 extends outwardly from said outer surface 18 of the flap 20 and projects through hole 56 when the flap 20 is mounted in the tubular member 30. It will be appreciated that providing flap 20 with a molded handle 50 and projection 52 eliminates the need for mounting fasteners such as pins, screws and rivets. The inherent spring tension of the flap 20 provides a valve exhibiting improved sealing capabilities when installed in a underhood air supply system.

It is to be understood, however, that even though numerous advantages and characteristics of the invention have been set forth in the foregoing description, together with details of the structure and function of the invention, the disclosure is illustrative only, and changes may be made in detail, especially in matters of size and shape of the parts within the principal of the invention, to the full extent indicated by the broad general meaning of the terms of which the appended claims are expressed.

What is claimed is:

1. An air flow control valve, comprising:
   (a) a tubular member having a wall and a side opening in said wall, said side opening being substantially similar in shape to a cross-section of said tubular member, said tubular member including a pair of opposite mounting points on said wall with at least one of said opposite points defining a hole through said wall;
   (b) a flexible and resilient, normally planar flap having a first portion and a second portion which together form a generally elongated oval shape with a first and a second end, said flap including a pair of pivot points adjacent said first and second ends, said pivot points positioned such that with said flap in a planar state an imaginary line connecting said pivot points defines a common border for said first and second portions, said first and second portions each extending outwardly from said common border to a side edge, said first portion having a radius greater than said second portion, said flap including a handle integral with said flap at one of said pivot points;
   (c) means for pivotally mounting said flap within said tubular member in line with said side opening with said pivot points being coaxially aligned and mounted to said opposite points on said wall of said tubular member and with said handle projecting through said hole and extending along said tubular member to form a generally arcuate shaped flap having an outer surface shaped like said wall at said side opening and having an outer edge configured to conform to said cross-sectional shape of said tubular member, said handle moving said flap between a first position in which said flap covers said side opening with said edge of said first portion substantially abutting against one side of said side opening and said side edge of said second portion overlapping an opposite side of said opening to seal off said side opening and allow air flow through said tubular member, and a second position in which said flap extends across said tubular member with said side edge of said first portion overlapping said opposite side of said side opening and said side edge of said second portion substantially abutting said wall of said tubular member opposite said side opening to seal off said tubular member and direct air flow between said tubular member and said side opening.

2. An air flow control valve in accordance with claim 1 wherein said handle is directly molded to the outer surface of said flap.

3. An air flow control valve in accordance with claim 1 wherein said opposite points on said wall define holes through said wall and said handle is directly molded to said flap at one pivot point and a projection extending outwardly from said outer surface is included at said other pivot point, said flap being pivotally mounted in said tubular member by said handle projecting through one of said holes and extending along said tubular member and said projection engaging said other hole.

4. An air flow control valve in accordance with claim 1 further comprising a second tubular member, said second tubular member being mounted to said tubular member at said side opening forming a generally Tee-type junction therebetween, whereby in said first position said side edge of said first portion substantially abuts against an interior surface of one wall of said second member at the junction of said wall of said second member and one side of said side opening and said side edge of said second portion overlaps an opposite side of aid side opening to allow air flow through said tubular member, and in said second position said flap extends across said tubular member with said side edge of said first portion overlapping an opposite wall of said second tubular member and said side edge of said second portion substantially abutting said wall of said tubular member opposite said side opening to seal off said tubular member and direct air flow between said tubular member and said second tubular member.

5. An air flow control valve, comprising:
   a flexible and resilient, normally planar flap having a first portion and a second portion which together form a generally elongated oval shape with a first and a second end, said flap including a pair of pivot points adjacent said first and second ends, said pivot points positioned such that with said flap in a planar state an imaginary line connecting said pivot points defines a common border for said first and second portions, said first and second portions each extending outwardly from said common border to a side edge, said first portion having a radius greater than said second portion, said flap including a handle intergral with said flap at one of said pivot points, said flap being pivotally mountable within a tubular member having a wall in line with a side opening in said tubular member, said pivot points being coaxially aligned and mounted to opposite points on said wall of said tubular member to form a generally arcuate shaped flap having an outer surface shaped like said wall at said side opening and an outer edge configured to conform to said cross-sectional shape of said tubular member, at least one of said opposite points defining a hole through which said handle projects and extends along said tubular member, said handle moving said flap between a first position in which said flap covers said side opening with said side edge of said first portion substantially abutting against one side of said side opening and said side edge of said second portion overlapping an opposite side of said side opening to seal off said side opening and allow air flow through said tubular member, and a second position in which said flap extends across said tubular member with said side edge of said first portion overlapping said opposite side of said side opening and said side edge of said second portion substantially abutting said wall of said tubular member opposite said side opening to seal off said tubular member and direct air flow between said tubular member and said side opening.

6. An air flow control valve, comprising:
   a flexible and resilient, normally planar flap having a first portion and a second portion which together form a generally elongated oval shape with a first and a second end, said flap including a pair of pivot points adjacent said first and second ends, said pivot points positioned such that with said flap in a planar state an imaginary line connecting said pivot points defines a common border for said first and second portions, said first and second portions each extending outwardly from said common border to a side edge, said first portion having a radius greater than said second portion, said flap having an outer surface and including a handle and a projection, said handle being directly molded to said flap at one pivot point and said projection extending outwardly from said outer surface of said flap at said other pivot point, said flap being pivotally mountable within a tubular member having a wall in line with a side opening in said tubular member, said pivot points being coaxially aligned and mounted to opposite points on said wall of said tubular member to form a generally arcuate shaped flap having said outer surface shaped like said wall at said side opening and an outer edge configured to conform to said cross-sectional shape of said tubular member, said opposite points defining holes through said wall, said handle projecting through one of said holes and extending along said tubular member and said projection engaging said other hole, said handle moving said flap between a first position in which said flap covers said side opening with said side edge of said first portion substantially abutting against one side of said side opening and said side edge of said second portion overlapping an opposite side of said side opening to seal off said side opening and allow air flow through said tubular member, and a second position in which said flap extends across said tubular member with said side edge of said first portion overlapping said opposite side of said side opening and said side edge of said second portion substantially abutting said wall of said tubular member opposite said side opening to seal off said tubular member and direct air flow between said tubular member and said side opening.

* * * * *

UNITED STATES PATENT AND TRADEMARK OFFICE
CERTIFICATE OF CORRECTION

PATENT NO. : 4,597,415
DATED : July 1, 1986
INVENTOR(S) : Steven S. Gieseke

It is certified that error appears in the above-identified patent and that said Letters Patent is hereby corrected as shown below:

Column 5, line 43, "said edge" should be -- said side edge--;

Column 5, line 46, "said opening" should be -- said side opening--;

Column 6, line 11, "aid" should be -- said--.

Signed and Sealed this

Eighteenth Day of November, 1986

Attest:

DONALD J. QUIGG

*Attesting Officer*  *Commissioner of Patents and Trademarks*